UNITED STATES PATENT OFFICE.

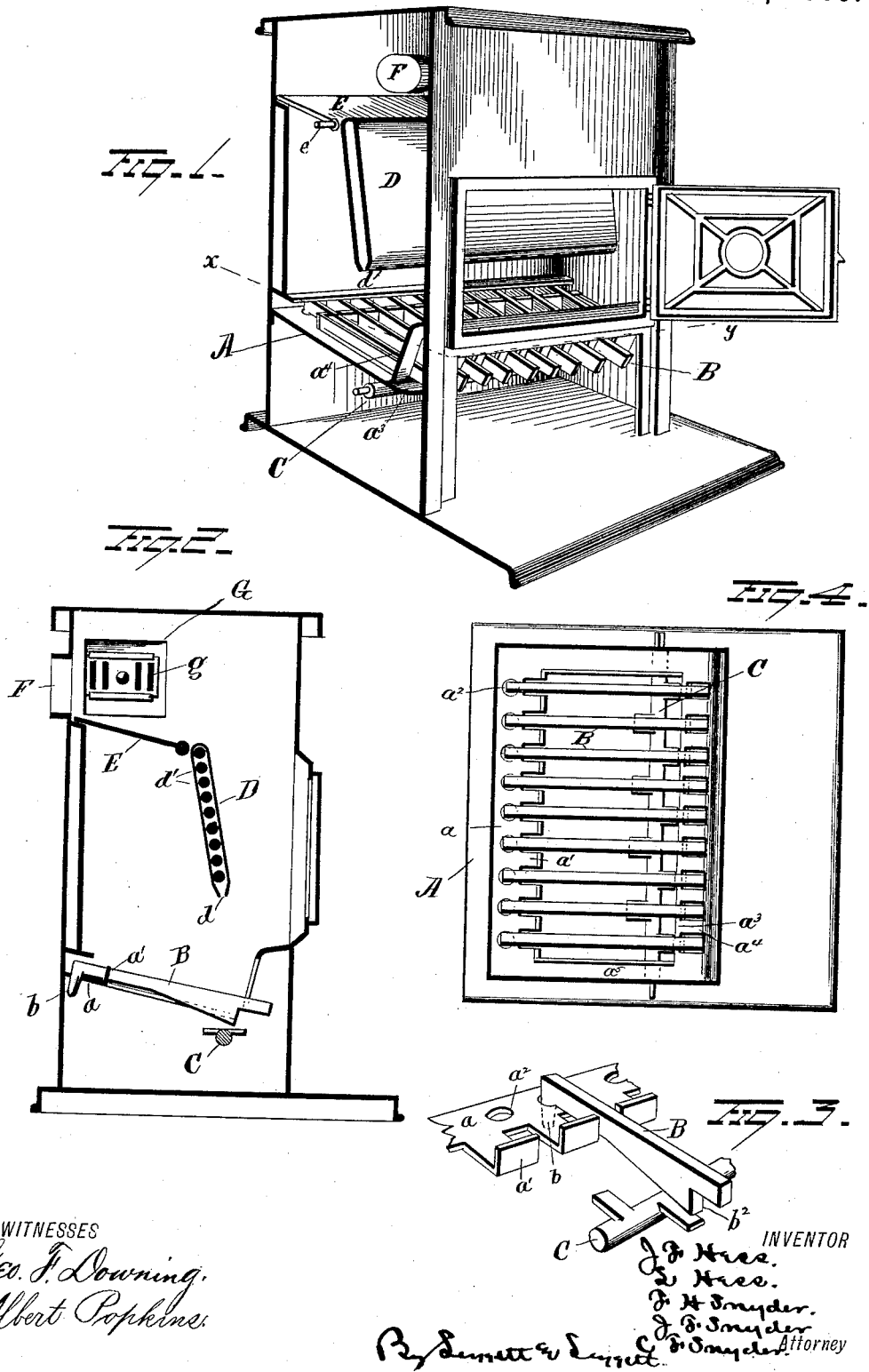

JACOB F. HESS, LENERD HESS, FREDRICK H. SNYDER, JACOB F. SNYDER, AND CHARLES F. SNYDER, OF MASSILLON, OHIO.

GRATE.

SPECIFICATION forming part of Letters Patent No. 320,783, dated June 23, 1885.

Application filed March 12, 1884. (No model.)

*To all whom it may concern:*

Be it known that we, JACOB F. HESS, LENERD HESS, FREDRICK H. SNYDER, JACOB F. SNYDER, and CHARLES F. SNYDER, of Massillon, in the county of Stark and State of Ohio, have invented certain new and useful Improvements in Grates; and we do hereby declare the following to be a full, clear, and exact description of the invention, such as will enable others skilled in the art to which it appertains to make and use the same.

Our invention relates to an improvement in grates, the object of the same being to provide a grate which shall be convenient, economical, and durable.

With these ends in view our invention consists in a grate composed of independent bars the rear ends of which rest loosely on a stationary bar, while the forward ends are adapted to be vertically reciprocated by a rockshaft.

Our invention further consists in certain features of construction and combinations of parts, as will be fully described, and pointed out in the claim.

In the accompanying drawings, Figure 1 is a view of a stove, portions of the outside being removed. Fig. 2 is a vertical sectional view. Fig. 3 is a detail view of a part of the grate, and Fig. 4 is a transverse sectional view through the line $x\,y$ of Fig. 1.

The stove here represented is intended for heating purposes in general, and is preferably rectangular in transverse section and higher than it is wide. The outside castings may be of any approved pattern, the object being to combine taste with durability and convenience.

A represents a grate-frame situated in the lower portion of the casing; and it consists of the rear casting, $a$, provided with a series of forwardly-extending arms or lugs $a'$, having their forward ends turned upward, and being a sufficient distance apart to admit one of the independent grate-bars B. The casting $a$ is further provided with a series of perforations, $a^2$, to receive the prongs on the ends of the grate-bars.

The forward portion of the grate-frame consists of a horizontal bar, $a^3$, which serves as a rest for the forward ends of the grate-bars, and with which the upwardly-extending outwardly-slanting bars $a^4$ are either rigidly or loosely connected. The bars $a^4$ are a sufficient distance apart to allow the grate-bars B an easy vertical motion between them.

The grate-frame consists, further, of the side bars, $a^5$, the whole being secured in its position by any approved means. The grate consists of a series of independent bars, B, of uniform construction, each terminating in a depending prong, $b$, at the rear, which passes down through the perforation $a^2$, formed in the rear casting. The forward ends of the bars B are made deeper than the rear ends, and are shouldered at $b^2$, to allow them to extend below the front grate-bar and prevent them from getting out of place by coals or cinders falling between the bars. A rock-bar, C, is situated immediately beneath the forward ends of the bars B, a little to the rear of the front bar of the grate-frame. The bar C is provided with two series of horizontal lugs—one on each side—preferably cast integral therewith, and so arranged that one series will lift each of the alternate bars B when the shaft C is turned in one direction, and the remaining alternate bars B when the shaft is turned in the opposite direction. This method of agitating the grate-bars is found very effective in removing the ashes, and whenever it is required to remove a cinder or pieces of slate which will not pass between the grate-bars the front end of one or more of the bars may be elevated sufficiently to allow the cinder or pieces of slate to fall through without seriously disturbing the fire. A flat central air-chamber, D, extends across the stove from end to end, and occupies an oblique position, extending from about the center of the upper portion of the stove in a downward forwardly-inclining direction to a point a suitable distance above the fuel in the fire-pot. The air-chamber D is closed, except a line of perforations, $d$, at the bottom and a series of perforations, $d'$, communicating with the chamber through the ends of the stove. Both front and back of the air-chamber D are exposed to the flame, and cause the air passing through the chamber to become highly heated, and when it passes through the perforations at the bottom of the chamber it will furnish a supply of oxygen to the center of the fire, causing a more perfect combustion of the gases and smoke, and thereby affording additional heat. Furthermore, the circulation of air between the walls of the chamber will prevent the said walls from becoming overheated and burning through. A rock-plate, E, provided with pintles $e$, by which it is mounted in suitable bearings, is adapted to lie horizontally over the opening between the upper edge of the chamber D and the back of the stove, just beneath the stove-pipe hole F. The plate E is further adapted to be rotated to an upright position and close the opening between the upper edge of the chamber D and the top of the stove. It is intended that the plate E shall occupy a horizontal position at all times, except when putting in fuel, thus causing the flame to pass forward up the front of and over the air-chamber D. A door, G, is conveniently placed in the end of the stove just above the plate E. The door is provided with a slide-damper, $g$, for regulating the draft. The top of the stove is provided with a hole and plain or ornamental cover. The front may be provided with a large door tastily constructed, which may be opened and expose the fire, when desired, thus producing the attractive features of an open-fire-place stove. The hearth may be of any construction consistent with the other parts of the stove.

The stove herein described forms no part of our present application further than to show one form of stove to which our improved grate is particularly well adapted for practical use, the stove proper being reserved as the subject-matter of a separate application.

It will be readily seen that the construction of the grate-bars independently of one another is a great saving in case of a breakage or warping of one of the bars, as in the present case the damaged bar can be replaced by a new one at slight cost, while in a grate composed of bars cast in a single piece it requires the purchase of an entire new grate at no inconsiderable expense. Instead of the perforations $a^2$ in the rear casting, a rod might be placed across the arms $a'$ and serve as a rest for the rear ends of the grate-bars; hence we do not wish to limit ourselves strictly to the construction herein set forth, but reserve the privilege of making such changes in the construction and arrangements of the several parts as fairly fall within the spirit and scope of our invention.

We are aware that grates composed of independent bars and constructed to be agitated by a rock-bar have hitherto been used, and we do not, therefore, claim the same, broadly; but, Having fully described our invention, what we claim as new, and desire to secure by Letters Patent, is—

In a heating-stove, the combination, with a casting having guides thereon, independent bars loosely supported on said casting between said guides, said bars being of uniform shape, and provided with depending prongs or hooks at their rear ends and with shoulders at their front ends, of a rock-bar constructed to vertically agitate the front ends of the bars in sets of alternate bars, substantially as set forth.

In testimony whereof we have signed this specification in the presence of two subscribing witnesses.

JACOB F. HESS.
LENERD HESS.
FREDRICK H. SNYDER.
JACOB F. SNYDER.
CHARLES F. SNYDER.

Witnesses:
EUGENE G. WILLISON,
ALBERT SNYDER.